United States Patent [19]
Carson

(10) Patent No.: US 10,390,496 B2
(45) Date of Patent: Aug. 27, 2019

(54) ENVIRONMENTAL CONTROL SYSTEM FOR PLANT GROWTH MANAGEMENT

(71) Applicant: William D Carson, Renton, WA (US)

(72) Inventor: William D Carson, Renton, WA (US)

(*) Notice: Subject to any disclaimer, the term of this patent is extended or adjusted under 35 U.S.C. 154(b) by 0 days.

(21) Appl. No.: 16/184,435

(22) Filed: Nov. 8, 2018

(65) Prior Publication Data

US 2019/0133052 A1     May 9, 2019

Related U.S. Application Data

(60) Provisional application No. 62/584,096, filed on Nov. 9, 2017.

(51) Int. Cl.
*A01G 9/24*          (2006.01)
*A01G 9/14*          (2006.01)
(Continued)

(52) U.S. Cl.
CPC ............... *A01G 9/246* (2013.01); *A01G 7/02* (2013.01); *A01G 7/045* (2013.01); *A01G 9/14* (2013.01);
(Continued)

(58) Field of Classification Search
CPC .......... A01G 9/246; A01G 7/02; A01G 7/045; A01G 9/14; A01G 9/18; A01G 9/22; A01G 9/26
See application file for complete search history.

(56) References Cited

U.S. PATENT DOCUMENTS

| 3,446,272 A | 5/1969 | Gaines, Jr. |
| 4,486,977 A | 12/1984 | Edgecombe et al. |

(Continued)

FOREIGN PATENT DOCUMENTS

| CN | 102640684 A | 10/2012 |
| CN | 106168822 A | 11/2016 |

(Continued)

OTHER PUBLICATIONS

Evaporative Cooling Efficiency of a Fogging System for Greenhouses. Hasan Husevin Ozturk, Cukurova University, Faculty of Agriculture, Department of Agricultural Machinery, Adana ,Turkey, (9 pgs).

(Continued)

*Primary Examiner* — Monica L Williams
(74) *Attorney, Agent, or Firm* — R. Reams Goodloe, Jr.

(57) ABSTRACT

A system for regulating the supply of conditioned gases to an environmentally controlled enclosure. A greenhouse or warehouse in which plants are grown are supplied with gases having a controlled absolute humidity, temperature, and carbon dioxide content. The properties of exhaust gas from the environmentally controlled enclosure are measured, and the mass of bone dry gas provided, the absolute humidity, temperature, and carbon dioxide content in the enclosure are maintained, and the transpiration rate of plants in the enclosure is measured by comparing properties of conditioned gas at the inlet with exhaust gas exhausted from the enclosure, in order to enhance transpiration of the plants in the enclosure, to allow the grower to maximize growth or other selected properties of the plants under cultivation.

41 Claims, 3 Drawing Sheets

Figure 1:
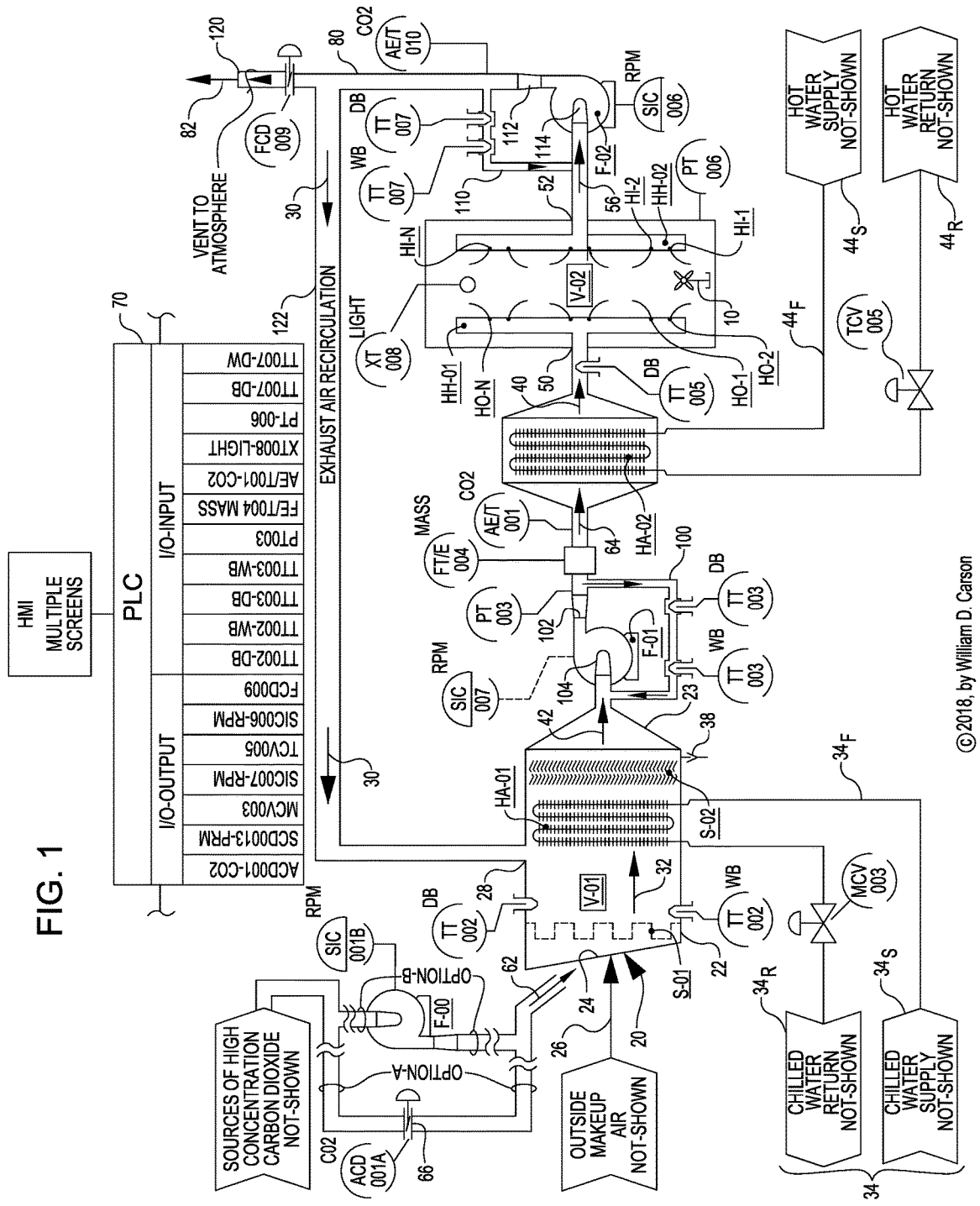

(51) Int. Cl.
  *A01G 7/02* (2006.01)
  *A01G 9/26* (2006.01)
  *A01G 9/22* (2006.01)
  *A01G 9/18* (2006.01)
  *A01G 7/04* (2006.01)
(52) U.S. Cl.
  CPC .......... *A01G 9/18* (2013.01); *A01G 9/22* (2013.01); *A01G 9/26* (2013.01)

(56) References Cited

U.S. PATENT DOCUMENTS

| | | | |
|---|---|---|---|
| 4,856,227 A | 8/1989 | Oglevee et al. | |
| 5,001,859 A | 3/1991 | Sprung | |
| 5,058,388 A | 10/1991 | Shaw et al. | |
| 5,392,611 A | 2/1995 | Assaf et al. | |
| 6,397,162 B1 | 5/2002 | Ton | |
| 6,705,043 B1 | 3/2004 | Opdam et al. | |
| 8,453,470 B2 | 6/2013 | Arbel et al. | |
| 9,161,498 B1 | 10/2015 | Shelor | |
| 2004/0115958 A1 | 6/2004 | Cho | |
| 2004/0194371 A1 | 10/2004 | Kinnis | |
| 2008/0000151 A1* | 1/2008 | Houweling | A01G 9/246 47/17 |
| 2008/0014857 A1 | 1/2008 | Spadafora et al. | |
| 2009/0076658 A1 | 3/2009 | Kinnis | |
| 2013/0111811 A1* | 5/2013 | Miyauchi | A01G 7/06 47/57.7 |
| 2015/0066215 A1* | 3/2015 | Buduri | G05B 15/02 700/276 |
| 2015/0282440 A1* | 10/2015 | Shelor | A01G 9/18 47/17 |
| 2015/0351325 A1 | 12/2015 | Shelor et al. | |
| 2015/0373926 A1 | 12/2015 | Park | |
| 2016/0109146 A1 | 4/2016 | Zhang et al. | |
| 2017/0064912 A1 | 3/2017 | Tabakman | |
| 2017/0203232 A1 | 7/2017 | Hare et al. | |
| 2017/0223912 A1 | 8/2017 | Gagne et al. | |

FOREIGN PATENT DOCUMENTS

| | | |
|---|---|---|
| EP | 0517432 A1 | 5/1992 |
| EP | 1464218 A1 | 10/2004 |
| JP | 2005-221213 | 8/2005 |
| JP | 3828548 | 10/2006 |
| KR | 10-1525172 | 6/2015 |
| WO | WO 2004/045272 A1 | 6/2004 |
| WO | WO 2017/130249 A1 | 8/2017 |

OTHER PUBLICATIONS

ScienceDirect, Agricultural and Forest Meteorology, Evaporative Cooling of a Ventilated Greenhouse Rose Crop, Marcel Fuchs. Institute of Soil, Water and Environmental Sciences, Agricultural Research Organization, The Volcani Center, Israel, revised form Mar. 28, 2006 and accepted May 2, 2006. (13 pgs).

PCT Search Report (PCT/JP2016/004653) dated Jan. 24, 2017 (WO2017/130249A1) Fujiyama Takeshi (Japanese Language and English machine translation (4pgs).

* cited by examiner

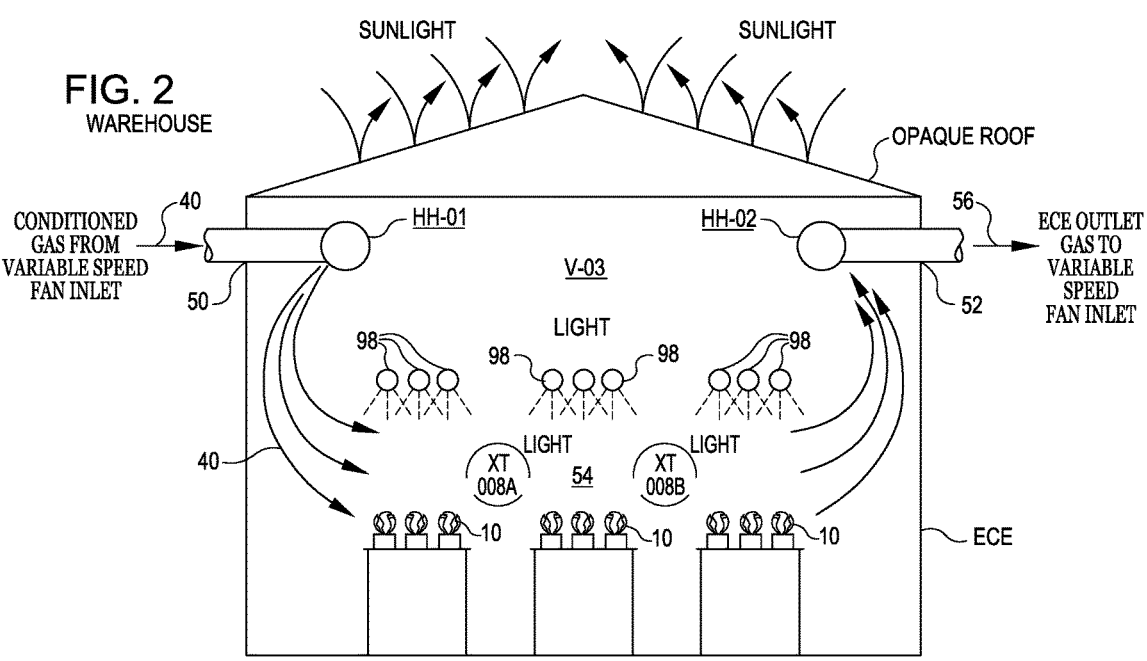
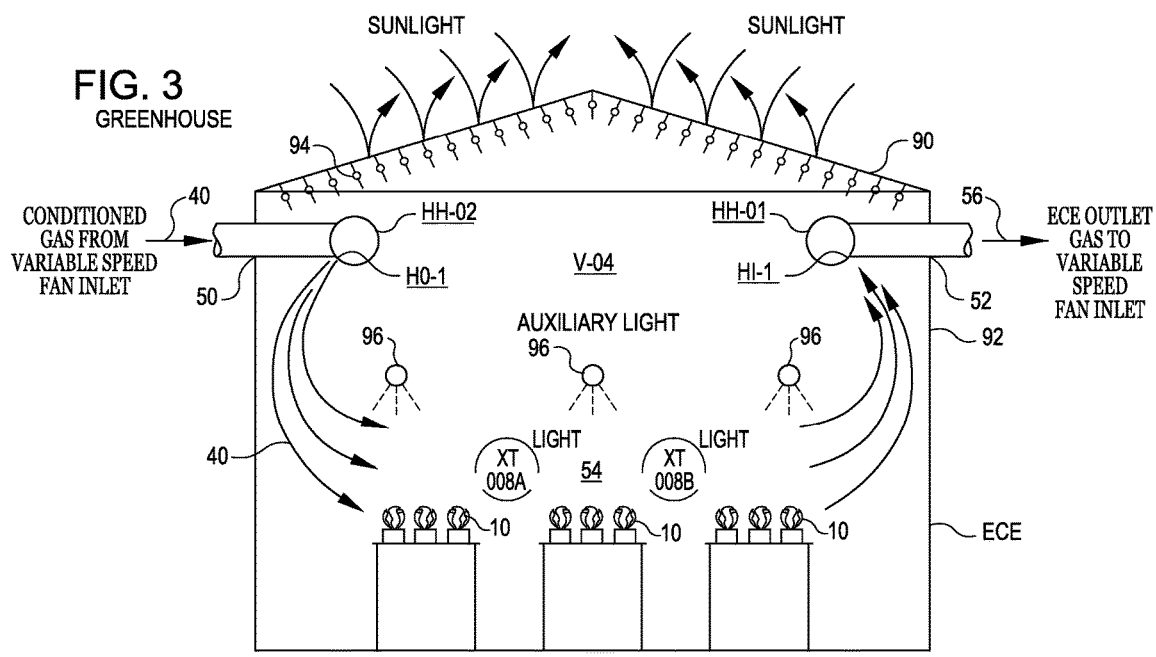

ENVIRONMENTAL CONTROL SYSTEM FOR PLANT GROWTH MANAGEMENT

STATEMENT OF GOVERNMENT INTEREST

Not applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

This application claims priority from prior U.S. Provisional Patent Application Ser. No. 62/584,096, filed Nov. 9, 2017, entitled ENVIRONMENTAL CONTROL SYSTEM FOR PLANT GROWTH MANAGEMENT, the disclosure of which is incorporated herein in its entirety, including the specification, drawing, and claims, by this reference

TECHNICAL FIELD

This application relates to a system and methods for management and control of the conditions in environmentally controlled enclosures as used in horticultural applications.

BACKGROUND

Plants are commercially grown in environmentally controlled enclosures (ECEs) which enable the operators to modify environmental conditions inside the enclosures as compared to the environmental conditions which exist outside of the environmentally controlled enclosures. While enclosures for growing plants are often used for to extend growing seasons, maintain temperatures, and control the watering of plants, environmentally controlled enclosures can also be used to increase growth of plants, as well as to optimize various plant properties.

Factors which are important to the grown of plants include the concentration of carbon dioxide in the atmosphere to which the plants are exposed, and the intensity of photosynthetically active radiation (PAR) to which the plants are exposed. Plants exposed to natural light convert a portion of the radiation energy received from the light, namely that portion of natural light with photons having a wave length of between about 400 nanometers and about 700 nanometers, into chemical energy, and generate plant matter, which in most cases may be generalized according to the following equation:

$$6H_2O + 6CO_2 + \text{'PAR photons'} \rightarrow C_6H_{12}O_6 + 6O_2$$

The reaction is substantially the same when light is received from artificial light sources having suitable wavelength(s) to provide photosynthetically active radiation. It suffices to understand that for plants to grow they need water ($H_2O$), carbon dioxide ($CO_2$) and photons with PAR wavelengths.

In addition, plants require environmental conditions conducive to growth. Accordingly, provision of suitable ranges of temperature, pressure, and absolute humidity is necessary when providing artificial environments for plant growth. Also, to generate proteins and complex cellular matter essential for growth, plants also require micro nutrients. Generally, plant growth is a chemical reaction, and it needs the basic reactants of (1) water, (2) carbon dioxide, (3) light, and (4) micro nutrients. If any one of the elements is limited (less abundant than the others in portion to the stoichiometry of the reaction), then the limited element will determine the number of reactions and growth of the plant.

Further, rooted plants are generally configured to transpire water. Water is taken into the plant at its roots, and then passes through the vascular system to the stomata in the leaf of the plant, where the water changes from liquid to vapor, and is diffused into the gases surrounding the plant, normally air. Water adjacent the root structure of plants may contain micro nutrients, which, if present, are pulled into the plant by the uptake and transpiration of water.

Transpiration of water from a plant results in natural evaporative cooling of the plant. Obviously, some of the water drawn into the roots is associated with the creation of plant matter and moisture in the plant body. The amount of water needed as an element of growth is small in comparison to overall transpiration. If a plant is adequately watered and other environmental conditions are in the correct range, the plant will transpire. If a plant is not watered, it loses the natural ability to cool itself, its source of micro nutrients, and one of the basic requirements for photosynthesis The intensity of light available to growing plants, as measured by photon flux or other comparable indicative parameter of photosynthetically active radiation, is well known to affect the growth rate of plants. Likewise, the amount of available carbon dioxide in an environmentally controlled enclosure where plants are growing is well known to affect the growth rate of plants.

In general, the growth of plants is proportional to their transpiration rate. And, the overall energy demand of a plant is primarily due to the requirement to supply the energy necessary for the transformation of water into water vapor during transpiration, i.e. the latent heat of vaporization of the water being transpired.

While the basic principles of plant growth are understood, apparent deficiencies in current plant growing practices indicate that it would nevertheless be desirable to provide improved systems and methods for enhancing the growth of plants, and for optimizing parameters to achieve desired growth rates of plants. Additionally, it would be desirable to provide systems and methods for collection of data which would enable optimization and repetition of desired growth rate conditions. In some embodiments, such systems and methods may involve maximizing growth of plants. In other embodiments, such system and methods may involve optimization of other qualities, such as taste, or sugar content, or maximizing the production of selected constituents such as essential oils. And, in some embodiments, it would also be desirable to provide improved systems and methods for the optimization of costs for the supply ingredients necessary for optimizing plant growth, namely for the optimization of the costs for operational energy and for water required for the growth of plants. Thus, there remains a need for a systems and methods which provides the equipment, sensors, control technology, and other components necessary for successful optimization of such requirements, in order to provide an environmentally controlled enclosure for optimizing the growth of plants for producing consistent results as optimized for a selected outcome, whether that be maximizing growth rate, optimization of characteristics or qualities such as taste, sugar content, essential oil content, or other constituents which may be economically important in horticultural production, or determining the economic intersection of minimization of costs of production such as water and energy, while maximizing the value of the plants produced.

SUMMARY

In order to provide a system and method for optimizing parameters for growth of plants in environmentally controlled enclosures, the system must provide proper conditions of to meet a multiplicity of simultaneous requirements based on (a) the plant(s) being raised in the environmentally controlled enclosure, (b) the ambient atmospheric conditions at the location of the environmentally controlled enclosure, and (c) conditions provided in the environmentally controlled enclosure as appropriate to meet absolute humidity, dry bulb temperature, and light intensity, i.e. photon flux, to maximize or at least optimize the transpiration rates of the plants. The conditions of gases entering the environmentally controlled enclosure must meet specified parameters, and the heating, ventilating, and air conditioning equipment that conditions such gases must be adjustable so that the specified parameters are achieved.

In an embodiment, a system is provided for the supply of conditioned gases to an environmentally controlled enclosure (ECE) that monitors transpiration rates of plants in the ECE and which controls the properties of the conditioned gases provided to the ECE. In various embodiments, the system includes a gas inlet system having a makeup gas inlet for receiving makeup gas and a recirculated gas inlet for receiving recirculated gas, which are mixed to provide an inlet gas. A variable mass flow inlet fan is provided for control of mass flow of conditioned gases to the ECE. In an embodiment, the variable mass flow inlet fan may be configured as a variable speed fan. A chilling system having a cooling coil is provided for cooling gases collected from the gas inlet system, by passing the inlet gases through the cooling coil. A heating system is provided for the reheat of gases discharged from cooling coil, by passing the cooled gases through a heating coil.

The environmentally controlled enclosure (ECE) includes an ECE inlet, an ECE outlet, and a recirculation system for recycling a portion of the exhaust gas leaving the ECE though the ECE outlet back to the gas inlet system, for eventual return to the ECE, primarily for the purpose of providing moisture in the gases when needed, as well as to minimize energy costs for the system, as appropriate. The recirculation system is configured to normally return a portion of exhaust gases from the ECE outlet, as recirculated gas, to the recirculated gas inlet in the gas inlet system, and to also normally exhaust a portion of the exhaust gases from the ECE to the atmosphere through an outlet vent.

A recycle fan may be used to maintain a pressure setpoint in the ECE. In an embodiment, the recycle fan may be a variable mass flow fan. In an embodiment, a variable mass flow recycle fan may be provided as a variable speed fan. In an embodiment, the recycle fan may be used in combination with a flow restriction device such as a damper, for regulation of the rate of removal of gases from the ECE. The recycle fan may be configured for transfer of exhaust gases from the ECE to the recirculation system.

A control system is provided, including sensors, transmitters, and a programmable logic controller. The control system includes sensors and data transmitters for dry bulb temperature and wet bulb temperature to determine the properties of gases at (1) the makeup gas inlet, (2) the outlet of the variable speed inlet fan, and (3) at the ECE outlet. The control system also includes pressure sensors and transmitters to determine the properties of gases at the outlet of the variable speed inlet fan and at the ECE outlet. A mass flow measurement device is provided at the outlet of the variable speed inlet fan. The programmable logic controller is configured for receiving data from the mass flow measurement device and from each of the dry bulb and said wet bulb temperature sensors, and the pressure sensors, and to simultaneously and independently control (a) the mass of conditioned gases entering the ECE by varying the mass of gases discharged downstream of the inlet fan, by varying the speed of the fan in the case of variable speed control, and (b) the absolute humidity of conditioned gases entering the ECE, and (c) the dry bulb temperature of conditioned gases entering the ECE. This is accomplished by cooling and reheating the gases collected by the gas inlet system as necessary to achieve a selected setpoint for absolute humidity and dry bulb temperature for mass of conditioned gases entering the ECE.

In an embodiment, the system may be configured for the programmable logic controller to receive data transmitted from the dry bulb and the wet bulb temperatures data sensors and transmitters monitoring the exhaust gases at the variable speed outlet fan, so that the programmable logic controller then calculates absolute humidity of the exhaust gases at the variable speed outlet fan. Then, the programmable logic controller modulates the speed of the variable speed inlet fan to maintain an absolute humidity set point in the exhaust gases at the outlet of the variable speed outlet fan.

The programmable logic controller is further configured to (a) calculate and record transpiration rates of plants in the ECE, as indicated by an amount of water vapor added to the conditioned gases entering the ECE as such water addition occurs during residence time in the ECE and during transformation of the conditioned gases to exhaust gases leaving the ECE, and (b) to operate the system to control absolute humidity and temperature of the conditioned gases at the outlet of the variable speed outlet fan. The control system may include a dry bulb temperature sensor immediately downstream of the heating coil, and the programmable logic controller is configured to regulate the dry bulb temperature of conditioned gases leaving the heating coil and entering the ECE.

In many embodiments, the system may further include a carbon dioxide supply system which provides a carbon dioxide rich gas stream to the gas inlet system. Then, the carbon dioxide rich gas stream mixes with the makeup gas and with the recirculated gas before the conditioned gases enter the ECE. In many embodiments, such mixing may be provided in an inlet system before the incoming gases reach the discharge of the inlet fan. When a carbon dioxide rich stream is provided, the system may further include a first carbon dioxide sensor configured to sense the amount of carbon dioxide in the conditioned gases entering the ECE. In an embodiment, the system may be configured to include a second carbon dioxide sensor configured to sense the concentration of carbon dioxide in gas leaving the ECE. Since the mass flow of conditioned gas entering the ECE is measured at the inlet fan, the programmable logic controller may be configured to compare the concentration of carbon dioxide in gas in the conditioned gases entering the ECE with the concentration of carbon dioxide in the exhaust gases leaving the ECE, to determine and record the uptake of carbon dioxide by plants in the ECE. With such data in hand, the carbon dioxide concentration in gases leaving the ECE may be adjusted to a carbon dioxide setpoint.

Thus a system is provided which includes the necessary equipment, sensors, control technology, control logic, and other components necessary to provide an environmentally controlled enclosure for optimizing the growth of plants for producing consistent results as optimized for a selected outcome, whether that be maximizing growth rate of plants in the enclosure, or the optimization of characteristics or qualities such as taste, sugar content, essential oil content, or other constituents which may be economically important in horticultural production, or determining the economic intersection of minimization of key costs of production, namely energy and water, while maximizing the value of the plants produced.

BRIEF DESCRIPTION OF THE DRAWING FIGURES

The system and method provided herein will be described by way of exemplary embodiments, illustrated in the accompanying drawing figures in which like reference numerals denote like elements, and in which:

FIG. 1 provides a process and instrument diagram for an embodiment for a system for an environmental control system for plant growth management, showing the general arrangement for a gas inlet system, an inlet fan, an outlet fan, an exhaust gas recirculation system, use of cooling and heating coils, gas mass flow measurement, the measurement of pressure in an environmentally controlled enclosure, the location of wet bulb temperature and dry bulb temperature sensors, and the relationship of the sensors and transmitters to a programmable logic controller (PLC) and human interface (HMI) system for system operation and control.

FIG. 2 provides a vertical cross-section schematic view of an environmentally controlled enclosure (ECE) when provided as a warehouse, showing the conditioned gases being supplied to an inlet header for supply to the ECE, and collection of exhaust gases through an outlet header, as well as plants in the ECE being provided with photons via artificial lighting.

FIG. 3 is similar to FIG. 2, but now provides a vertical cross-section schematic view of an environmentally controlled enclosure (ECE) when provided as a greenhouse, showing the conditioned gases being supplied to an inlet header for supply to the ECE, and collection of exhaust gases through an outlet header, as well as plants in the ECE being provided with photons via the natural sunlight, as well as by artificial lighting.

Figure 4:
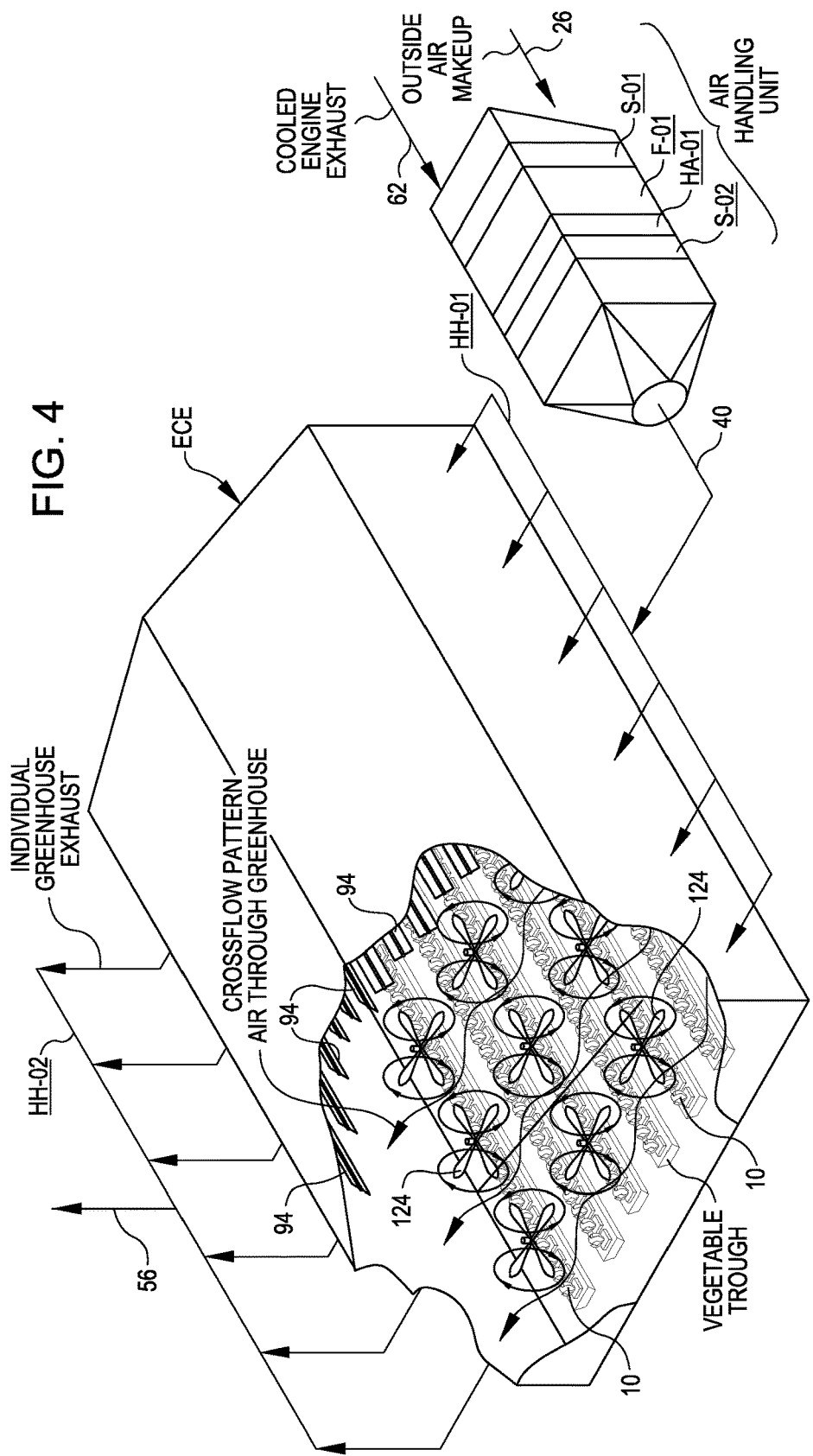

FIG. 4 is a perspective view of an embodiment for an environmentally controlled enclosure (ECE) which may be provided with the system described herein, showing in conceptual format the use of an air handling unit for collecting outside air makeup, and using cooled engine exhaust for supply of carbon dioxide (which may be provided at a selected concentration range, which may be between the ambient air carbon dioxide concentration and about 2,400 parts per million) and including therein cooling and heating coils for conditioning of gases before supply to the ECE, as well as use of cross-flow ventilation in the ECE.

As those of skill in the art will recognize, in FIG. 1, various controls, instruments, and related symbols have been set out using the standard nomenclature set out by the Instrument Society of America Standard ANSI/ISA-5.1-2009, entitled Instrumentation Symbols and Identification, as approved 18 Sep. 2009.

The foregoing figures, being merely exemplary, contain various elements that may be present or omitted from various embodiments for a system and methods that may be used to provide environmental conditions in environmentally controlled enclosures, in order to produce plants at optimum growth rates, or with respect to optimum plant qualities or characteristics, or at economically advantageous combinations of cost and value of the plant products. An attempt has been made to draw the figures in a way that illustrates at least those elements that are significant for an understanding of the system and methods taught herein, and for the alternate configurations thereof.

Overall, various other elements for the provision of conditioned gases to environmentally controlled enclosures, or for the control and recordation and adjustment of parameters pertinent thereto, and methods of use thereof, may be utilized, within the teachings hereof and within the coverage of the claims set forth herein.

DETAILED DESCRIPTION

Attention is directed to FIG. 1, which illustrates components which may be advantageously utilized in an embodiment of a system for controlling conditions in an environmentally controlled enclosure ("ECE") in horticultural applications. An ECE, here labeled with reference characters V-02, may be utilized for growing plants 10 therein. Although various components utilized in the system and method disclosed herein may be familiar to those skilled in the heating, ventilation, and air conditioning (HVAC) arts, and to those familiar with the conditioning of structures in horticultural service, the control philosophy, placement of sensors, and control variables as taught herein are unique. In an embodiment, the system may include a gas inlet system 20 that may be provided by an intake plenum 22, which defines an enclosure having a volume and which is noted by reference number V-01. The gas inlet system 20 includes a makeup gas inlet 24 for receiving makeup gas 26 such as outside air 26 and a recirculated gas inlet 28 for receiving recirculated gas 30, which are mixed to provide an inlet gas stream 32. In an embodiment, an intake filter here labeled with reference characters S-01 may be provided. The intake filter S-01 may be sized and shaped to be effective for eliminating external contaminants, particulates, and pests. A nozzle 23 may be provided on the intake plenum 22 to discharge gases 42 from intake plenum V-02. Cooling coil(s) HA-01 may be either integrally included with intake plenum 22, or separately provided. The cooling coil HA-01 is part of a chilling system 34 for cooling the inlet gas stream 32 collected at the gas inlet system 20. The chilling system 34 may include a chilled fluid supply system $34_S$, a chilled fluid return system $34_R$, a control valve noted by reference characters MCV-003 for controlling the flow of the chilled fluid $34_F$ to and from the cooling coil HA-01, and a chiller (not shown) for chilling the chilled fluid to be supplied to the cooling coil HA-01. In an embodiment the chilling system 34 may include a chilled fluid system. In an embodiment, the chilled fluid system 20 may include the use of water as a chilled fluid. In an embodiment, a mist eliminator S-02 may be provided to eliminate carryover of water which condenses on the cooling coil HA-01. At the cooling coil HA-01 the entering gas is cooled to or below a specific dry bulb temperature, which results in the condensation of water vapor on the cooling coil HA-01, and which thus sets the absolute humidity at or below the humidity of a saturated gas at the dry bulb temperature of gas leaving the cooling coil HA-01. Any droplets of which escape into the gases leaving the cooling coil HA-01 are separated from the gas by the separator S-02 before the cooled gas 42 leaves intake plenum V-01, and may be discharged through drain 38.

An inlet fan F-01 is provided for supply of conditioned gases 40 to the environmentally controlled enclosure ECE which has an internal volume and which is noted by reference characters V-02. In an embodiment, the inlet fan F-01 may be a variable speed fan. In an embodiment, varying the speed of the inlet fan F-01 may be used to vary and control the mass of conditioned gases 40 entering the environmentally controlled enclosure ECE, and thus vary the mass of gases available for humidification within the ECE, as the amount of water vapor added from transpiration of plants varies over time.

In an embodiment, heating coil HA-02 is used to reheat the cooled gases 64 which are discharged from fan F-01, having been received from cooling coil HA-01. The heating coil HA-02 is part of a heating system 44 for reheating the cooled gases 42 which exit from the cooling coil HA-01, and thus produced conditioned gases 40. The heating system 44 may include a heating fluid supply system $44_S$, a heating fluid return system $44_R$, and a control valve as noted by reference characters TCV-005 for controlling the flow of the heated fluid $44_F$ to and from the heating coil HA-02, and a boiler (not shown) for heating the heating fluid to be supplied to the heating coil HA-02. In an embodiment the heating system 44 may include a hot fluid system. In an embodiment, the hot fluid system 44 may include the use of water as a hot fluid.

As shown in FIG. 1, and as may be better seen in FIG. 2 or in FIG. 3, an environmentally controlled enclosure V-02 (or V-03 in FIG. 2, or V-04 in FIG. 3) includes an ECE inlet 50 and an ECE outlet 52. As also illustrated in FIG. 1, a makeup gas injection header HH-01 may be fluidly coupled with the ECE inlet 50 to provide conditioned gases 40 to an ECE (e.g., V-02, or V-03, or V-04). In an embodiment, the makeup gas injection header HH-01 may include a plurality of distribution outlets in a series of outlets HO-1, HO-2, through HO—N, where N is a positive integer, in order to provide the conditioned gases 40 to growing plants 10 in the ECE. The distribution outlets are fluidly coupled with the variable speed inlet fan F-01. The gas 54 in an ECE (e.g., V-02, or V-03, or V-04) leaves the ECE as exhaust gas 56 at an exhaust gas pickup header (HH-02). In an embodiment, the exhaust gas pickup header HH-02 may include a plurality of collection inlets in a series of inlets HI-1, HI-2, through HI-N, where N is a positive integer, in order to collect the exhaust gases 56 from the ECE.

The plurality of collection inlets HI-1, HI-2, through HI-N, at the exhaust gas pickup header HH-02 are fluidly coupled the recycle fan F-02. Recycle fan F-02 is provided for removal of exhaust gases 56 from the ECE (e.g., V-02, or V-03, or V-04). In an embodiment, the recycle fan F-02 may be a variable speed fan. In an embodiment, varying the speed of the recycle fan F-02 may be used to maintain the pressure in an ECE at a selected pressure setpoint in the ECE. In an embodiment, a pressure setpoint in an ECE may be slightly above ambient atmospheric pressure, so as to maintain positive pressure on the ECE. In an embodiment, a pressure setpoint may be slightly below ambient atmospheric pressure, so as to maintain a negative pressure on the ECE.

In various embodiments, in order to enhance growth of plants 10 in an ECE, supplemental carbon dioxide may be provided. In an embodiment, a carbon dioxide supply system 60 may be utilized, which provides a carbon dioxide rich gas stream 62 to the gas inlet system 20. In an embodiment, the carbon dioxide rich gas stream 62 may be provided in a manner so that the carbon dioxide rich gas stream mixes with the makeup gas stream 26 and the recirculated gas 30 before the conditioned gases 40 enter an ECE. In an embodiment, as shown in FIG. 1, the carbon dioxide rich gas stream may be combined with makeup gases 26 and recirculated gas 30 and thus included in a mixed gas stream 32 before entering the cooling coil HA-01. In an embodiment a first carbon dioxide sensor AET-001 may be provided, located and configured to sense the amount of carbon dioxide in the conditioned gases 40 entering the ECE (e.g. V-02, V-03, or V-04). In an embodiment, the first carbon dioxide sensor AET-001 may be located to measure the amount of carbon dioxide in the gas stream 64 discharged from inlet fan F-01. In various embodiments, the amount of carbon dioxide in the gas stream 64 may be equivalent to the amount of carbon dioxide in the conditioned gases 40. In various embodiments, the amount of carbon dioxide in the conditioned gases 40 may be controlled between the ambient air concentration and about 2,400 parts per million, or between about 1,200 parts per million and about 2,400 parts per million. In various embodiments, the oxygen concentration in the conditioned gases 40 may be controlled at about 20% $O_2$, or slightly higher. In various embodiments, the supply of conditioned gases 40 to environmentally controlled enclosures ECE may be at the rate of about 30,000 cubic feet per minute per acre of environmentally controlled enclosure ECE. As such rates, the environmentally controlled enclosures ECE may be provided with about three air changes per hour.

In an embodiment the carbon dioxide supply system 60 may include a carbon dioxide rich gas stream 62 resulting from the combustion of a hydrocarbon fuel (not shown). In an embodiment the source of the carbon dioxide rich stream may be an engine, such as an internal combustion engine. In an embodiment, the source of carbon dioxide may be heaters using hydrocarbons as fuel. In such cases, a source of carbon dioxide is positioned in proximity to the inlet gas system 20, at V-01. In an embodiment, the carbon dioxide supply system 60 may include an adjustable carbon dioxide rich gas stream damper 66, which may be operated by a damper controller ACD-001A for regulation of the flow of the carbon dioxide rich stream 62. As further discussed below, a programmable logic controller 70 may be provided to regulate adjustment of the carbon dioxide rich gas stream damper 66, in response to carbon dioxide sensor AE/T-001-CO2 on the gas stream 64 or alternately on the conditioned gas stream 40, to modulate the carbon dioxide flow to maintain the set point. Note that overall, the flow of the gas stream containing carbon dioxide is normally quite small in comparison to the flow of the makeup outside air and the recycled gases. Optionally, a carbon dioxide supply system 60 may be provided using a carbon dioxide variable mass flow control device such as variable speed fan F-01, and wherein the programmable logic controller 70 regulates adjustment of the carbon dioxide variable mass flow control device such as the variable speed fan F-01 to maintain carbon dioxide at a specified carbon dioxide setpoint in the gas 64, which as shown in FIG. 1 can be considered to have the same concentration of carbon dioxide as in the conditioned gases 40 entering the ECE V-02.

Instrumentation and control systems provided are integrated though the programmable logic controller 70. The dry bulb temperature of the makeup gas stream 26 (to which may optionally be added the carbon dioxide rich gas stream 62) may be provided by a dry bulb temperature sensor/transmitter, TT-002-DB. Similarly, the wet bulb temperature of the makeup gas stream 26 (to which may optionally be added the carbon dioxide rich gas stream 62) may be provided by a wet bulb temperature sensor/transmitter, TT-002-WB. In an embodiment, a moisture control valve, MCV-003, may be used to modulate the flow of chilled fluid 34$_F$ through the cooling coil HA-01. Then, a cooled gas 42 dry bulb temperature sensor transmitter, TT-003-DB may be used to sense the dry bulb temperature of cooled gases leaving the cooling coil HA-01. A cooled gas 42 pressure sensor/transmitter, PT-003 is used to sense the pressure of the cooled gases 42 leaving the variable volume inlet fan F-01. The variations in the flow of cooled gases 42 are measured by the cooled gas 42 flow meter sensor/transmitter, FE/T-004. The dry bulb temperature of the conditioned gases 42 is measured by the dry bulb temperature sensor/transmitter, TT-005 DB.

The pressure in the ECE, V-02, is measured by the pressure sensor transmitter, PT-006, and the pressure measured is sent to the programmable logic controller 70 for use in maintaining a setpoint pressure in ECE V-02 by varying the mass of exit gas 56 pulled out of the ECE V-02 by outlet fan F-02.

The dry bulb temperature of the environmentally controlled enclosure ECE V-02 is determined by a dry bulb temperature sensor/transmitter, TT-007-DB sensing dry bulb temperature of the exit gas 56, as seen at discharge 112 of outlet fan F-02. The wet bulb temperature of the environmentally controlled enclosure ECE V-02 is determined by a wet bulb temperature sensor/transmitter, TT-007-WB, which senses the web bulb temperature of the exit gas 56.

The variable speed recycle fan F-02 is provided to maintain pressure in the ECE at a selected pressure setpoint. The fan F-02 is configured for transfer of exhaust gas 56 from the ECE V-02 to a recirculation system 80. In an embodiment, the exhaust gas 56 leaving the ECE V-02 may be temperature regulated to provide a specified discharge temperature, or a maximum discharge temperature. In an embodiment, the maximum discharge temperature of exhaust gas 56 may be set at 90° F. In an embodiment, the exhaust gas 56 from the ECE V-02 may be regulated to provide a specified relative humidity, or a maximum relative humidity. In an embodiment, the exhaust gas 56 may be regulated to provide 90% relative humidity. As an example, during summer months, conditioned air 40 entering the environmentally controlled structure ECE V-02 may be cooled, and dehumidified to 60° F. and a saturated condition. Energy thus removed from the ECE V-02 when the exhaust gas 56 is 90° F. and 90% relative humidity may amount to as much as 274 tons per acre of environmentally controlled enclosure ECE. As a result it can be easily appreciated that blocking solar radiation using mechanical shades 94 may be important to reduce overall operating expenses. Further, in some embodiments, a water fogging system (not shown, but familiar to those of skill in the art) may be provided to discharge very small droplets of water for evaporation in the environmentally controlled structure, particularly for those instances where transpiration from natural respiration of plants in the greenhouse is insufficient to provide cooling to the extent desired to achieve the specified temperature for the exhaust gas 56. In any event, in an embodiment, the recirculation system 80 may be configured to return a portion of the exhaust gas 56 as a recirculated gas 30 to the gas inlet system 20. A portion of the exhaust gas 56 may be sent through exhaust gas 56 discharge flow control damper FCD-009, to be discharged as vent gas 82.

Light may be provided to an environmentally controlled enclosure (e.g., V-02, V-04) via sunlight through conventional greenhouse light transmissive roof 90 and/or wall 92 components, such as a glass roof 90 as noted in FIG. 3. In such case, louvered or roll-up or other shades 94 as known in the art may be utilized. In an embodiment, mechanical shades 94 may block up to about 60% of the solar radiation. In an embodiment, auxiliary lighting may be provided by lighting fixtures 96.

Light may be substantially or entirely provided to an environmentally controlled enclosure (e.g., V-02, V-03) via primary lighting fixtures 98, which deliver light to the ECE at appropriate wavelengths to provide photosynthetically active photons, normally in the range of from about 400 to about 700 nanometers. Light intensity meters, designated XT-008 in FIG. 1, and as XT-008A and XT-008B in FIGS. 2 and 3, may be provided to determine the photon flux provided by the lighting fixtures 96 or 98.

Overall, the programmable logic controller ("PLC") 70 may include digital logic, and may include analog logic, record and retain historical data of the various instruments described herein, and provide for feedback and control of the conditioned gas 40 entering the ECE, and of the exhaust gas 56 leaving the ECE. The PLC 70 may include a Human Machine Interface (designated HMI in FIG. 1) which may include various screens to allow the operator/grower to control and analyze conditions, transpiration, and plant growth within the ECE.

Overall, when used with a greenhouse (V-02 or V-04) or a warehouse (V-02 or V-03) for growing plants, the system and method of control provided by the system described serves two basic purposes, namely (a) the grower may accurately provide controlled growth conditions (e.g., dry bulb temperatures, absolute humidity, and carbon dioxide availability to the plants) within the ECE, and (b) generate trends and records of plant growth as effected by the controlled grown conditions. As a result, the system enables the grower to determine the precise relationships for controlled growth conditions and resulting attributes for a specific crop being raised in the ECE.

In one novel aspect, the system and method described herein enables the grower to monitor the transpiration of plants in an ECE. This can be accomplished since by measuring the amount of water vapor passing into the gas (primarily air) in the ECE, the transpiration rate can be determined. This can be accomplished by measurement of the absolute humidity of the conditioned gases 40 entering the ECE and the absolute humidity of the exhaust gases 56 leaving the ECE, as well as measuring the mass flow of bone dry gas provided as a portion of the conditioned gases 50 entering the ECE. As an example, one may utilize molecular weight of air as the molecular weight ("MW") of bone dry gas ("BDG") with very little error. By doing so, transpiration may be measured, recorded, and tracked. This is important in the horticultural arts since, fundamentally, plant growth is directly proportional to transpiration. Using the instruments noted above, the absolute humidity of a gas at a specific point can be calculated if dry ($T_d$) and wet ($T_w$) bulb temperatures are known along with total pressure ($P_t$) at that specific point. Consequently, by knowing the wet bulb temperature ($T_w$), the vapor pressure of the water ("$H_2O$") vapor in the a gas can be calculated, where $P_v$ is a function of wet bulb temperature only, and $P_v(T_w)=P_v$ and $Pv=3226.99\times10^{\wedge}[(1-1165.67/(T_w+459.76)\times(-8.333\times 10^{\wedge}-10)*(T_w+459.59)^{\wedge}3+3.072\times10^{\wedge}-6\times(T_w+459.67)^{\wedge}2-3.468\times10^{\wedge}-3\times(T_w+459.67)+4.395553)]$ where $T_w$ is in degrees Fahrenheit.

At saturated conditions, partial pressure ($P_r$) of water vapor is equal to vapor pressure ($P_v$) of water. Absolute humidity is the measure of the mass of water vapor per mass of bone dry air, regardless of temperature, and may also be expressed as weight of water vapor per volume of bone dry air. Mathematically, absolute humidity gamma ($\Gamma$) may be defined at any condition as $$\Gamma = [P_p \Gamma/(P_t - P_p)] \times [MW_{H2O}/MW_{BDG}]$$

and at a saturated condition, as $$\Gamma s = [P_v/(P_t - P_v)] \times [MW_{H2O}/MW_{BDG}]$$

Hence, saturated humidity is a function of wet bulb temperature ($T_w$) and total pressure ($P_t$) where $\Gamma s(T_w, P_t) = [P_v(T_w)/(P_t - P_v(t_w))] * [MW_{H2O}/MW_{BDG}]$.

The molecular weight of bone dry gas being supplied to an ECE is not usually known, but can be estimated as air, as noted above. When using such an assumption, the molecular weight of the bone dry gas may be stated as follows:

$$MW_{BDG} MW_{air} = 28.964 \text{ pounds per pound mole}$$

Wet bulb temperature ($T_w$) is a direct measurement using a very small amount of water. Since most of the makeup air providing a cooled gas stream 42 to an ECE is outside air, this approximation provides an estimated error of less than one percent (1%). With respect to measurement of the wet bulb temperature ($T_w$), water is kept in contact with the temperature sensing device (e.g., TT-003-WB), and with the gas stream being measured. Since the water evaporated off of the temperature sensing device (e.g. TT-003-WB) is continuously replenished, the heat of evaporation for the very small amount of water evaporated is assumed zero. Because the process of saturating gas with water is adiabatic, no heat is either added to or lost from the measured gas mixture, i.e. the process occurs at constant enthalpy with the gas mixture cooling to an adiabatic saturation temperature. In other words, the total change of enthalpy in such a process is zero, and therefore, air saturated with water has the same enthalpy as has does the initial dry gas. Knowing this, the absolute humidity can thus be determined using a mass and energy balance. The enthalpy of dry gas on unit mass basis may be determined as follows:

The enthalpy of bone dry gas=

$$H_{BDG1} = Cp_{BDG} \times (T_d - t_{ref}) + \Gamma 1 \times [Cp_{H2Ov} \times (T_d - T_{ref}) + \Delta H \lambda_{ref}]$$

The enthalpy of gas saturated with water vapor=

$$H_{s1} = Cp_{BDG} \times (T_w - t_{ref}) + \Gamma_s(T_w, P_t) \times [Cp_{H2Ov} \times (T_w - t_{ref}) + \Delta H \lambda_{ref}]$$

where
$Cp_{BDG}$=the specific heat of bone dry gas, approximated with air,
$Cp_{air}$=0.24*BTU/lb-° F.; and
$Cp_{H2O}$=the specific heat of water vapor, namely 0.45-BTU/b-° F.

Typically the reference temperature of water's triple point $T_{ref}$=32° F. Also, the heat of vaporization of water at 32° F., $\Delta H \lambda_{ref}$=1075.5-BTU/lb. So, if $H_{BDG1} H_{s1}$ then the unknown term of '$\Gamma 1$' (the absolute humidity of dry air), can be solved for directly given $T_w$, $T_d$ and $P_t$:

$$\Gamma 1(T_w, T_d, P_t) = \{Cp_{air} \times (T_d - T_w) + \Gamma s(T_w, P_t) \times [C_{ph2ov} \times (T_w - T_{ref}) + \Delta H \lambda_{ref}]\} / [C_{ph2ov} \times (T_d - T_{ref}) + \Delta H \lambda_{ref}]$$

With the wet bulb temperature ($T_w$), the dry bulb temperature ($T_d$) and vapor pressure of the water ($P_v$), the absolute humidity and enthalpy of this gas can be calculated. Knowing actual volumetric flow, temperature, and absolute pressure, the molar flow of moist air can be calculated along with the mass flow of bone dry air.

For system measurement and control, the PLC 70 receives total pressure (Pt), dry bulb temperature (Td), and web bulb temperature (Tw), and mass flow data from sensors at several points (e.g., TT-003-DB, TT-003-WB, and FT/E-004). In an embodiment, by using above described computational method, the absolute humidity, and enthalpy may be calculated directly at three points:

(a) at inlet fan F-01 discharge (cooled gas 64);
(b) at heating coil HA-01 discharge (conditioned gas 40); and
(c) at outlet fan F-02 discharge (exhaust gas 56).

The PLC 70 receives the dry bulb temperature ($T_d$) and the wet bulb temperature ($T_w$) for the outside makeup air stream 26 via temperature sensors TT-002-DB and TT-02-WB, respectively. The dry bulb ($T_d$) and wet bulb ($T_w$) temperature are measured in cooled gas 42, after the cooling coil HA-01. Because no water is added between inlet fan F-01 and heating coil HA-02—or at heating coil HA-02—the absolute humidity is the same in gas stream 64 and in the conditioned gas 40.

The system described enables the operator to controls the properties of the conditioned gas 40 which enters the ECE, including (a) absolute humidity, (b) dry bulb temperature, (c) carbon dioxide concentration, as well as (d) the rate of mass flow of the conditioned gas 40 (primarily air) which enters the ECE. In addition to controlling the inlet conditions, the PLC is setup, as described above, to monitor the properties of the conditioned gas 40 and of the exhaust gas 56, and to calculate the differences. With such data, the PLC 70 may directly calculate and provide to the operator the capacity of the conditioned gas 40 to acquire moisture, the rate of transpiration of plants in the ECE as measured by the amount of moisture added to the bone dry gas passing through the ECE, and the energy added to and removed as gas flows through the inlet gas plenum (V-01), the inlet fan (F-01), the heating coil (HA-01), the environmentally controlled enclosure (e.g. V-02, or V-03, or V-04), and outlet fan (F-02). Given the sensors provided, and the operation of the PLC 70, any excess or deficit in energy will be immediately sensed. In an embodiment, the PLC 70 may be set up to record and display trends in one or more of (a) the rate of transpiration, (b) the differential carbon dioxide concentration, and (c) the increases and decreases of light intensity, i.e. the photon flux over time. Thus, the system described herein will provide the user with meaningful data and feedback. Accordingly, the user will be able to evaluate and judge the dynamics of the system provided for growing plants.

The system described herein manipulates the data point of absolute humidity by controlling the absolute humidity of the cooled gases 42 to a set point by modulating the chilled fluid flowing through cooling coil HA-01, using the moist control valve (MCV-002). The absolute humidity and enthalpy of cooled gas 42 is calculated in the PLC using data provided by wet bulb temperature transmitter (TT-003-WB), dry bulb temperature transmitter (TT-003-DB), and absolute pressure transmitter (PT-003). In an embodiment, the dry bulb temperature sensor and transmitter (TT-003-DB) and the wet bulb temperature sensor and transmitter (TT-003-WB) may be positioned in a slip stream 100 located between the discharge 102 and inlet 104 of inlet fan F-01. The mass flow meter (FT/E-004) senses the flow of cooled gas 64 entering the heating coil HA-02. With this information, total amount and rate of moisture and energy of the conditioned gas 50 which is sent to the environmentally controlled enclosure (ECE) V-02 is calculated by the PLC.

The dry bulb temperature transmitter (TT-005-DB) senses the dry bulb temperature of the conditioned gas 40 as it exits heating coil HA-02, and the temperature control valve (TCV-005) modulates the heating fluid $44_F$ flowing through the heating coil HA-02 to maintain the setpoint dry bulb temperature.

Overall, the system is set up to provide the sensors and air handling equipment to provide that the conditioned gas 40 entering the environmentally controlled enclosure (ECE) V-02 has the absolute humidity, carbon dioxide concentration, and dry bulb temperature all independently set to a selected setpoint for each specific property.

At the inlet to the ECE, the conditioned gas 40 enters the ECE and is injected evenly using the distribution header HH-01, so that the conditioned gas 40 preferably does not directly impinge on plants in the ECE, and so that flow of the conditioned gas 40 is properly balanced throughout the ECE.

Generally, the system may be set up so that sensors for measuring dry bulb temperature, wet bulb temperature, mass flow, and pressure, all transmit their output data values of sensed parameters to the programmable logic controller. At the PLC, some or all of the data may be stored. The stored data may be used with algorithms performing the functions as indicated above to generate (a) manipulated intensive property data, namely partial pressure of water vapor, enthalpy, and absolute humidity, and (b) manipulated extensive property data, namely mass flow rate, energy flow rates, and transpiration rate, and to then determine a rate of change over time of dry bulb temperature, wet bulb temperature, and absolute humidity of conditioned gases entering the ECE and of gas leaving the ECE, and of the transpiration rate of plants in the ECE.

In various embodiments, an environmentally controlled enclosure such as the depicted V-02 may be used for any one or more of variety of species of plants and in different stages of growth, such as germination, vegetative, flowering, or fruit bearing stages. The system provided herein provides the grower the equipment, historical information, and controls, to enable the grower to manage the ECE and to determine the dry bulb temperature, absolute humidity, carbon dioxide concentration, and light intensity conditions which provide results as desired. Also, the programmable logic controller may be configured for input of watering rates, or alternately or additionally, nutrient rates.

The exhaust gas 56 from the ECE is pulled through outlet fan F-02. A wet bulb temperature transmitter (TT-007-WB) and dry bulb temperature transmitter (TT-007-DB) along with pressure transmitter PT-006 provide the PLC the information to develop data for the absolute humidity and enthalpy of exhaust gas 56. In an embodiment, the dry bulb temperature sensor and transmitter (TT-007-DB) and the wet bulb temperature sensor and transmitter (TT-007-WB) may be positioned in a slip stream 110 located between the discharge 112 and inlet 114 of inlet fan F-02. In an embodiment, an absolute humidity set point for the exhaust gas 56 leaving outlet fan F-02 may be controlled by a variable speed drive (SIC-007-RPM) on the inlet fan F-01 to increase or decrease total flow of gases being sent through the ECE. The pressure in V-02 may be controlled by modulating the speed of outlet fan F-02 using (SIC-006-RPM) to maintain a pressure set point in the ECE. Thus, by keeping a constant pressure in the ECE V-02 the mass flow of exhaust gas 56 through outlet fan F-02 follows in inlet flow of conditioned gases 40 being provided by inlet fan F-01.

The exhaust gas 56 leaves outlet fan F-02 and is either vented to the atmosphere as vent gas 82, or is returned to the gas inlet system 20 as recirculated gas 30, to intake plenum 20, i.e. V-01, from the stack or returns to the makeup up air Plenum V-01. The exhaust vent 120 may be provided with a flow control damper (FCD-009) in the path to the exhaust vent 120, which when closed, forces the exhaust gas 56 through the recirculation duct 122 to the intake plenum 20, i.e. V-01. Using the data from the wet bulb temperature transmitter (TT-002-WB) and dry bulb temperature transmitter (TT-002-DB), and by either estimating or acquiring the ambient atmospheric pressure, then the absolute humidity of the incoming gas, i.e. makeup outside air 26 (the effect of moisture in the carbon dioxide rich gas stream 62 is normally small). In an embodiment, sensors TT-002-DB and TT-002-DB WB may be positioned to sense the makeup outside air 26, which can then be compared against the absolute humidity of the exhaust gas 56. If the absolute humidity of makeup outside air 26 is extremely low, then most of the exhaust gas 56 is returned as recirculated gas 30 to be mixed with the makeup outside air 26 in intake plenum V-01 before feed to the cooling coil HA-01. However, if the absolute humidity of makeup outside air 26 is higher than the absolute humidity of the exhaust gas 56, then the majority, if not all, of the exhaust gas 56 may be vented through vent outlet 120 to the atmosphere as vent gas 82.

The Human Machine Interface (HMI) may be provided with the PLC 70. In an embodiment, multiple display screens may be provided for interface with an operator. In an embodiment, a touch screen associated with the PLC may provide multiple pages of options, including:

(1) A control page with a graphical depiction of the process with annotated (digital images or readout) of all of sensed conditions and set points. Basically, the control page will have an appearance much like the configuration set out in FIG. 1. An operator may be able to change control setpoints using the control page. In an embodiment, the control page may also include total moisture removed from the ECE over time (i.e., transpiration rate), and heat removed from inlet gases 32 via cooling coil HA-01, the heat added by heating coil HA-02, and the heat removal which occurs within the ECE V-02, as determined by the change in properties between the conditioned gas 40 entering the ECE and in the exhaust gas 56.

(2) A schedule page allows the grower to program set point variations for specific time periods, such as daily or weekly changes, based on a particular plant growing program plan.

(3) A trend page which provides graphical data for sensed and calculated parameters over time. An operator will be able to select particular data streams for display, and will be able to select the time span of the data displayed. Historical data stored by the PLC may provide context to current conditions and for possible changes to setpoints.

By review of graphical depictions of properties and conditions over time, the grower will be able to analyze the system and predict results for the plants under cultivation. With the experience of operation, the grower has the data at hand to improve product quality and reduce costs as appropriate.

Further, in various embodiments, the timing of hours of operation of a primary or supplementary artificial light source which provides a selected photon flux to the plants 10 in an ECE may be controlled by the programmable logic controller. In various embodiments, an ECE may be provided having a structure which admits natural light, such as a greenhouse. In such a structure, the system may further comprise shades 94 as noted in FIG. 3 or in FIG. 4. In such cases, the operation of shades 94 may be controlled by the programmable logic controller. In an embodiment, an ECE may be a greenhouse. In an embodiment, an ECE may be a warehouse. As shown in FIG. 4, in various embodiments, propeller fans 124 may be utilized to increase local air circulation within the ECE.

In various embodiments, the system may be configured to control the dry bulb temperature and absolute humidity in an ECE in order to optimize conditions for growth of plants in the ECE. In an embodiment, (a) the dry bulb temperature and absolute humidity of conditioned gases entering the ECE, and (b) carbon dioxide concentration of conditioned gases entering the ECE and in gases leaving the ECE, may be controlled to optimize conditions for growth of plants in said ECE. In an embodiment, (a) the dry bulb temperature and absolute humidity of conditioned gases entering the ECE, (b) the dry bulb temperature and absolute humidity of conditioned gases leaving the ECE, and (c) carbon dioxide concentration of conditioned gases entering the ECE and in gases leaving the ECE, may be controlled to optimize conditions for growth of plants in said ECE. In an embodiment, (a) the dry bulb temperature and absolute humidity of conditioned gases entering the ECE, (b) the dry bulb temperature and absolute humidity of conditioned gases leaving the ECE, (c) carbon dioxide concentration of conditioned gases entering the ECE and in gases leaving the ECE, and (d) the transpiration rate of plants in the ECE, may be controlled to optimize conditions for growth of plants in the ECE. In an embodiment, the duration and photon flux of natural light may also be controlled to optimize conditions for growth of plants in an ECE. In an embodiment, the duration and photon flux of artificial light may also be controlled to optimize conditions for growth of plants in an ECE.

In the foregoing description, numerous details have been set forth in order to provide a thorough understanding of the disclosed exemplary embodiments for systems and methods for the operation of environmentally controlled enclosures for the growing plants. However, certain of the described details may not be required in order to provide useful embodiments, or to practice selected or other disclosed embodiments. Further, the description may include, for descriptive purposes, various terms such as optimized, maximized, minimized, and the like. Such usage should not be construed as limiting. Terms that are relative only to a setpoint or other reference are not meant to be interpreted as absolute limitations, but are instead included in the foregoing description to facilitate understanding of the various aspects of the disclosed embodiments. Various components are described which may be employed alternatively, yet be included in some designs or components for use in a particular situation. Accordingly, the systems and method(s) described herein may be utilized in whole or in part in various discrete operations, in a manner that is most helpful in a particular circumstance. However, the order of description should not be construed as to imply that such alternatives are necessarily order dependent, or that use of various components is necessarily in the alternative. Also, the reader will note that the phrase "in one embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by this invention, and may be embodied in other specific forms without departing from the spirit or essential characteristics thereof. Embodiments presented herein are to be considered in all respects as illustrative and not restrictive or limiting. This disclosure is intended to cover the systems and methods described herein, and functional or structural equivalents thereof, as occur within the scope of the appended claims. Modifications and variations are possible in light of the above teachings. Therefore, the protection afforded to this invention should be limited only by the claims set forth herein, and the legal equivalents thereof.

The invention claimed is:

1. A system for supply of conditioned gases to an environmentally controlled enclosure (ECE) that monitors transpiration rates of plants in the ECE and controls properties of conditioned gases provided to the ECE, said system comprising:
   a gas inlet system, said gas inlet system comprising a makeup gas inlet for receiving makeup gas and a recirculated gas inlet for receiving recirculated gas, which are mixed to provide an inlet gas;
   a variable mass flow inlet fan for regulation of mass flow of conditioned gases to the ECE;
   a chilling system for cooling gases collected at said gas inlet system;
   a heating system for heating gases discharged from said chilling system;
   an ECE inlet;
   an ECE outlet;
   a recirculation system, said recirculation system configured to normally return a portion of exhaust gases from said ECE outlet as recirculated gas to said recirculated gas inlet, and to normally exhaust a portion of said exhaust gases from said ECE through an outlet vent;
   a variable mass recycle fan to maintain pressure in said ECE at a selected pressure setpoint, said variable mass recycle fan configured for transfer of exhaust gases from said ECE to said recirculation system;
   a control system comprising sensors and data transmitters for (a) dry bulb temperature, (b) wet bulb temperature, to determine the properties of gases at each of (1) said makeup gas inlet, (2) said outlet of said variable mass inlet fan, and (3) said ECE outlet, (c) pressure sensors and transmitters to determine the properties of gases at each of (1) said outlet of said variable mass inlet fan and (2) at said ECE outlet, and (d) a mass flow measurement device at said outlet of said variable mass inlet fan;
   said control system further comprising a programmable logic controller, the programmable logic controller configured for receiving data from said mass flow measurement device and from each of said dry bulb and said wet bulb temperature sensors, pressure sensors, and configured to simultaneously and independently control (a) the mass of conditioned gases entering the ECE by varying the mass output of said inlet fan, and (b) the absolute humidity of conditioned gases entering the ECE, and (c) the dry bulb temperature of conditioned gases entering the ECE, by cooling and heating the gases collected by the gas inlet system as necessary to achieve an absolute humidity, dry bulb temperature for mass of conditioned gases entering the ECE; and
   said programmable logic controller further configured to (a) calculate and record transpiration rates of plants in said ECE, as indicated by an amount of water vapor added to the conditioned gases entering the ECE which occurs during transformation of the conditioned gases to exhaust gases leaving the ECE, and (b) to operate the system to control absolute humidity and temperature of the conditioned gases at said outlet of said variable mass inlet fan.

2. The system as set forth in claim 1, wherein inlet gas collected by the gas inlet system is cooled to at least the dew point of the inlet gas by the chilling system.

3. The system as set forth in claim 1, wherein the inlet gas collected by the gas inlet system is cooled below the dew point of the inlet gas by the chilling system.

4. The system as set forth in claim 1, wherein the system includes an adjustable outlet vent damper, wherein said programmable logic controller regulates adjustment of the outlet vent damper to modulate the mass of gases returning to the recirculated gas inlet, by (a) increasing the mass of recirculated gas returning to the recirculated gas inlet when the absolute humidity of the makeup gas is higher than the absolute humidity of the recirculated gas; and (b) decreasing the mass of recirculated gas returning to the recirculated gas inlet when the absolute humidity of the makeup gas is lower than the absolute humidity of the recirculated gas, unless the absolute humidity of conditioned gases entering the ECE drops below an absolute humidity setpoint for the conditioned gases entering the ECE, in which case the mass of recirculated gas returning to the recirculated gas inlet is increased by an amount sufficient to maintain the absolute humidity in the conditioned gases entering the ECE at the absolute humidity setpoint for conditioned gases entering the ECE.

5. A system as set forth in claim 1, further comprising a carbon dioxide supply system, said carbon dioxide supply system providing a carbon dioxide rich gas stream to said gas inlet system, so that said carbon dioxide rich gas stream mixes with said makeup gas and said recirculated gas before the conditioned gases enter the ECE.

6. A system as set forth in claim 5, wherein said system further comprises a first carbon dioxide sensor, said first carbon dioxide sensor configured to sense the amount of carbon dioxide in the conditioned gases entering the ECE.

7. A system as set forth in claim 5, wherein said carbon dioxide supply system comprises a source of gases from combustion of hydrocarbon fuel.

8. A system as set forth in claim 6, wherein the carbon dioxide supply system includes an adjustable carbon dioxide rich gas stream damper for regulation of the flow of said carbon dioxide rich stream, and wherein said programmable logic controller regulates adjustment of the carbon dioxide rich gas stream damper.

9. A system as set forth in claim 6, wherein the carbon dioxide supply system includes a carbon dioxide variable mass flow control device, and wherein said programmable logic controller regulates adjustment of the carbon dioxide variable mass flow control device to maintain carbon dioxide at a specified carbon dioxide setpoint in the conditioned gases entering the ECE.

10. A system as set forth in claim 9, wherein said carbon dioxide variable mass flow control device comprises a variable speed fan.

11. A system as set forth in claim 9, further comprising a second carbon dioxide sensor configured to sense the concentration of carbon dioxide in gas leaving the ECE.

12. A system as set forth in claim 1, further comprising a plurality of distribution outlets in said ECE for supply of conditioned gases to said ECE, said distribution outlets fluidly coupled with said variable mass flow inlet fan.

13. A system as set forth in claim 12, further comprising a plurality of collection inlets in said ECE, said collection inlets fluidly coupled with said variable mass flow recycle fan.

14. A system as set forth in claim 1, wherein said makeup gas comprises ambient air.

15. A system as set forth in claim 1, wherein said a chilling system comprises a chilled fluid system.

16. A system as set forth in claim 15, wherein said chilled fluid system comprises a chilled water system.

17. A system as set forth in claim 1, wherein said heating system comprises a hot fluid system.

18. A system as set forth in claim 1, wherein said hot fluid system comprises a hot water system.

19. A system as set forth in claim 1, wherein said control system further comprises a dry bulb temperature sensor immediately downstream of said heating system and wherein said heating system is controlled by said programmable logic controller to regulate the dry bulb temperature of conditioned gases entering said ECE.

20. A system as set forth in claim 19, wherein said programmable logic controller receives data transmitted from said sensors and data transmitters at said variable mass flow outlet fan for (a) dry bulb temperature, and (b) wet bulb temperature, and wherein said programmable logic controller calculates absolute humidity in gases at said outlet of said variable mass flow outlet fan, and wherein said programmable logic controller modulates the mass output of said variable mass flow inlet fan to maintain an absolute humidity set point in said gases at said outlet of said variable mass flow outlet fan.

21. A system as set forth in claim 20, wherein said programmable logic controller receives data transmitted from sensors and data transmitters at said ECE outlet for pressure, and wherein said programmable logic controller modulates the mass output of said variable mass flow outlet fan to maintain a pressure setpoint in said ECE.

22. A system as set forth in claim 21, wherein said pressure setpoint is above ambient atmospheric pressure.

23. A system as set forth in claim 21, wherein said pressure setpoint is below ambient atmospheric pressure.

24. A system as set forth in claim 1, wherein said ECE further comprises an artificial light source having a photon flux, and wherein timing of hours of operation of said artificial light source is controlled by said programmable logic controller.

25. A system as set forth in claim 24, wherein the photon flux of light provided by said artificial light source is controlled by said programmable logic controller.

26. The system as set forth in claim 25, wherein (a) dry bulb temperature, absolute humidity of conditioned gases entering the ECE, and (b) carbon dioxide concentration of conditioned gases entering the ECE and in gases leaving the ECE, (c) the duration and photon flux of said artificial light source, and (d) transpiration rate of plants in said ECE, are controlled to optimize conditions for growth of plants in said ECE.

27. A system as set forth in claim 1, wherein said ECE comprises structures to admit natural light, and wherein the system further comprises shades for shading plants in said ECE from natural light, and wherein operation of the shades is controlled by said programmable logic controller.

28. A system as set forth in claim 27, wherein said ECE comprises a greenhouse.

29. A system as set forth in claim 27, wherein said ECE comprises a warehouse.

30. The system as set forth in claim 27, wherein (a) dry bulb temperature, absolute humidity of conditioned gases entering the ECE, and (b) carbon dioxide concentration of conditioned gases entering the ECE and in gases leaving the ECE, and (c) the duration and photon flux of said natural light, and (d) transpiration rate of plants in said ECE, are controlled to optimize conditions for growth of plants in said ECE.

31. A system as set forth in claim 1, wherein said ECE comprises a greenhouse.

32. A system as set forth in claim 1, wherein said ECE comprises a warehouse.

33. A system as set forth in claim 1, or in claim 17, or in claim 20, or in claim 21, wherein sensors for measuring dry bulb temperature, wet bulb temperature, mass flow, and pressure, transmit the data values of sensed parameters to said programmable logic controller, where such data is stored, and where stored algorithms are utilized to generate (a) manipulated intensive property data, namely partial pressure of water vapor, enthalpy, and absolute humidity, and (b) manipulated extensive property data, namely mass flow rate, energy flow rates, and transpiration rate, and to then determine a rate of change over time of dry bulb temperature, wet bulb temperature, and absolute humidity of conditioned gases entering the ECE and of gas leaving the ECE, and of the transpiration rate of plants in the ECE.

34. A system as set forth in claim 11, wherein said second carbon dioxide sensor transmits the concentration of carbon dioxide in gas leaving the ECE to said programmable logic controller, to compare with the concentration of carbon dioxide in gas in the conditioned gases entering the ECE, to determine and record the uptake of carbon dioxide by plants in the ECE, and to adjust the carbon dioxide concentration of gases leaving the ECE to a carbon dioxide setpoint.

35. The system as set forth in claim 34, wherein (a) dry bulb temperature and absolute humidity of conditioned gases entering the ECE, and (b) carbon dioxide concentration of conditioned gases entering the ECE and in gases leaving the ECE, are controlled to optimize conditions for growth of plants in said ECE.

36. The system as set forth in claim 1, or in claim 11, or in claim 34, wherein said programmable logic controller comprises algorithms which control dry bulb temperature and absolute humidity in conditioned gases in said ECE at a mass flow rate for conditioned gases entering said ECE, to maximize the transpiration rate of plants in said ECE.

37. The system as set forth in claim 1, wherein dry bulb temperature and absolute humidity are controlled to optimize conditions for growth of plants in said ECE.

38. A system as set forth in claim 1, wherein said ECE further comprises
an artificial light source, and wherein timing of hours of operation of said artificial light source is controlled by said programmable logic controller, and wherein the photon flux of light provided by said artificial light source is controlled by said programmable logic controller;
a carbon dioxide supply system, said carbon dioxide supply system providing a carbon dioxide rich gas stream to said gas inlet system, so that said carbon dioxide rich gas stream mixes with said makeup gas and said recirculated gas before the conditioned gases enter the ECE, the carbon dioxide supply system further including a carbon dioxide variable mass flow control device;
a first carbon dioxide sensor, said first carbon dioxide sensor configured to sense the amount of carbon dioxide in the conditioned gases entering the ECE, and wherein said programmable logic controller regulates adjustment of the carbon dioxide variable mass flow control device to maintain carbon dioxide at a specified carbon dioxide setpoint in the conditioned gases entering the ECE;
a second carbon dioxide sensor configured to sense the concentration of carbon dioxide in gas leaving the ECE, wherein said second carbon dioxide sensor transmits the concentration of carbon dioxide in gas leaving the ECE to said programmable logic controller, to compare with the concentration of carbon dioxide in gas in the conditioned gases entering the ECE, to determine and record the uptake of carbon dioxide by plants in the ECE, and to adjust the carbon dioxide concentration of gases leaving the ECE to a carbon dioxide setpoint; and
wherein (a) dry bulb temperature, absolute humidity of conditioned gases entering the ECE, and (b) carbon dioxide concentration of conditioned gases entering the ECE and in gases leaving the ECE, and (c) the timing of hours of operation and photon flux of said artificial light source, (d) the mass of conditioned gases entering the ECE; and (e) the transpiration rate of plants in said ECE, are controlled to optimize conditions for growth of plants in said ECE.

39. A system as set forth in claim 1, wherein said ECE further comprises
an artificial light source, and wherein timing of hours of operation of said artificial light source is controlled by said programmable logic controller, and wherein the photon flux of light provided by said artificial light source is controlled by said programmable logic controller;
a carbon dioxide supply system, said carbon dioxide supply system providing a carbon dioxide rich gas stream to said gas inlet system, so that said carbon dioxide rich gas stream mixes with said makeup gas and said recirculated gas before the conditioned gases enter the ECE, the carbon dioxide supply system further including a carbon dioxide variable mass flow control device;
a first carbon dioxide sensor, said first carbon dioxide sensor configured to sense the amount of carbon dioxide in the conditioned gases entering the ECE, and wherein said programmable logic controller regulates adjustment of the carbon dioxide variable mass flow control device to maintain carbon dioxide at a specified carbon dioxide setpoint in the conditioned gases entering the ECE;
a second carbon dioxide sensor configured to sense the concentration of carbon dioxide in gas leaving the ECE, wherein said second carbon dioxide sensor transmits the concentration of carbon dioxide in gas leaving the ECE to said programmable logic controller, to compare with the concentration of carbon dioxide in gas in the conditioned gases entering the ECE, to determine and record the uptake of carbon dioxide by plants in the ECE, and to adjust the carbon dioxide concentration of gases leaving the ECE to a carbon dioxide setpoint; and
wherein (a) dry bulb temperature, absolute humidity of conditioned gases entering the ECE, and (b) carbon dioxide concentration of conditioned gases entering the ECE and in gases leaving the ECE, and (c) the timing of hours of operation and photon flux of said artificial light source, (d) the mass of conditioned gases entering the ECE; and (e) the transpiration rate of plants in said ECE, are controlled to optimize conditions for growth of plants in said ECE.

40. A system as set forth in claim 1, wherein said ECE comprises (a) structures to admit natural light, or (b) artificial light sources, or (c) both, wherein timing of hours of operation of said artificial light source is controlled by said programmable logic controller, and wherein the photon flux of light provided by said natural light or said artificial light source, or both, source is controlled by said programmable logic controller;

- a carbon dioxide supply system, said carbon dioxide supply system providing a carbon dioxide rich gas stream to said gas inlet system, so that said carbon dioxide rich gas stream mixes with said makeup gas and said recirculated gas before the conditioned gases enter the ECE, the carbon dioxide supply system further including a carbon dioxide variable mass flow control device;
- a first carbon dioxide sensor, said first carbon dioxide sensor configured to sense the amount of carbon dioxide in the conditioned gases entering the ECE, and wherein said programmable logic controller regulates adjustment of the carbon dioxide variable mass flow control device to maintain carbon dioxide at a specified carbon dioxide setpoint in the conditioned gases entering the ECE;
- a second carbon dioxide sensor configured to sense the concentration of carbon dioxide in gas leaving the ECE, wherein said second carbon dioxide sensor transmits the concentration of carbon dioxide in gas leaving the ECE to said programmable logic controller, to compare with the concentration of carbon dioxide in gas in the conditioned gases entering the ECE, to determine and record the uptake of carbon dioxide by plants in the ECE, and to adjust the carbon dioxide concentration of gases leaving the ECE to a carbon dioxide setpoint; and
- wherein (1) dry bulb temperature, absolute humidity of conditioned gases entering the ECE, and (2) carbon dioxide concentration of conditioned gases entering the ECE and in gases leaving the ECE, and (3) the timing of hours of operation and photon flux of said artificial light source, (4) the mass of conditioned gases entering the ECE; and (5) the transpiration rate of plants in said ECE, are controlled to optimize conditions for growth of plants in said ECE.

41. A system as set forth in claim 1, wherein said variable mass flow inlet fan comprises a variable speed fan.

\* \* \* \* \*

UNITED STATES PATENT AND TRADEMARK OFFICE
CERTIFICATE OF CORRECTION

PATENT NO. : 10,390,496 B2  
APPLICATION NO. : 16/184435  
DATED : August 27, 2019  
INVENTOR(S) : William D. Carson Page 1 of 2

It is certified that error appears in the above-identified patent and that said Letters Patent is hereby corrected as shown below:

On the Title Page

Column 2, "References Cited", under "Other Publications", Line 2, after the words "Evaporative Cooling Efficiency of a Fogging System for Greenhouses. Hasan", delete "Husevin" and substitute therefore --Huseyin--.

Column 2, "References Cited", under "Other Publications", Line 3, after the words "Department of Agricultural Machinery, Adana, Turkey." insert --Received 02.08.2002.--.

On page 2, Column 2, "References Cited", under "Other Publications", Line 4, after the words "The Volcani Center, Israel,", insert --Received 18/July 2005--.

In the Specification

Column 2, Line 27, after the word "photosynthesis", insert --.--.

Column 4, Line 23, after the words "wet bulb", delete "temperatures" and substitute therefore --temperature--.

Column 6, Line 35, after the words "receiving makeup gas", delete "26".

Column 6, Line 43, after the word "discharge", delete "gases" and substitute therefore --cooled gas--.

Column 7, Line 25, after the words "embodiment, the", delete "hot fluid" and substitute therefore --heating--.

Column 8, Line 41, after the words "carbon dioxide rich", insert --gas--.

Column 8, Line 52, after the words "variable speed", insert --inlet--.

Signed and Sealed this  
Twenty-sixth Day of May, 2020

Andrei Iancu  
*Director of the United States Patent and Trademark Office*

CERTIFICATE OF CORRECTION (continued)
U.S. Pat. No. 10,390,496 B2

Column 8, Line 55, after the words "variable speed", insert --inlet--.

Column 9, Line 19, after the words "the mass of", delete "exit" and substitute therefore --exhaust--.

Column 9, Line 24, after the words "temperature of the", delete "exit" and substitute therefore --exhaust--.

Column 9, Line 28, after the words "temperature of the", delete "exit" and substitute therefore --exhaust--.

Column 9, Line 42, after the words "months, conditioned", delete "air" and substitute therefore --gas stream--.

Column 10, Line 19, after the words "conditioned gas", insert --stream--.

Column 10, Line 43, after the words "humidity of the conditioned", delete "gases" and substitute therefore --gas stream--.

Column 10, Line 46, after the words "portion of the conditioned", delete "gases 50" and substitute therefore --gas stream 40--.

Column 11, Line 56, after the words "So, if", delete "$H_{BDG1''}H_{s1}$" and substitute therefore --$H_{BDG1''}=H_{s1}$--.

Column 12, Line 14, after the words "outside makeup", delete "air" and substitute therefore --gas--.

Column 12, Line 37, after the words "heating coil", delete "(HA-01)" and substitute therefore --(HA-02)--.

Column 12, Line 66, after the word "gas", delete "50" and substitute therefore --40--.

Column 13, Line 23, after the words "the PLC", insert --70--.

Column 13, Line 55, after the words "and inlet 114 of", delete "inlet" and substitute therefore --outlet--.

Column 14, Line 6, after the words "to the intake plenum", delete "20" and substitute therefore --22--.

Column 14, Line 14, delete "TT-002-DB WB" and substitute therefore --TT-002-WB--.

Column 14, Line 24, after the words "through", delete "vent outlet" and substitute therefore --exhaust vent--.

Column 14, Line 63, after the word "controller", insert --70--.